United States Patent
Ikeda

[11] Patent Number: 6,065,571
[45] Date of Patent: May 23, 2000

[54] DRUM BRAKE SYSTEM AND DEVICE

[75] Inventor: Takashi Ikeda, Nagoya, Japan

[73] Assignee: Nisshinbo Industries Inc., Tokyo, Japan

[21] Appl. No.: 09/053,742

[22] Filed: Apr. 2, 1998

[30] Foreign Application Priority Data

Apr. 22, 1997 [JP] Japan ................................. 9-118879

[51] Int. Cl.[7] ............................................... F16D 51/00
[52] U.S. Cl. ..................... 188/79.61; 188/2 D; 188/325; 188/328
[58] Field of Search ................. 188/2 D, 79.54, 188/79.55, 79.61, 79.57, 79.64, 106 A, 325–334

[56] References Cited

U.S. PATENT DOCUMENTS

| | | | |
|---|---|---|---|
| 3,666,058 | 5/1972 | Quiney | 188/106 A |
| 4,076,105 | 2/1978 | Aono | 188/106 A |
| 4,243,125 | 1/1981 | Spaargaren et al. | 188/79.64 |
| 4,387,792 | 6/1983 | Imamura | 188/328 |
| 4,480,726 | 11/1984 | Idesawa | 188/79.64 |
| 4,678,067 | 7/1987 | Thompson | 188/328 |
| 4,753,325 | 6/1988 | Jaksic | 188/2 D |
| 4,955,458 | 9/1990 | Shellhouse | 188/325 |
| 5,029,676 | 7/1991 | Yamamoto | 188/79.54 |
| 5,042,623 | 8/1991 | Yamamoto | 188/79.54 |
| 5,092,428 | 3/1992 | Kobayashi et al. | 188/106 A |
| 5,167,304 | 12/1992 | Capek | 188/325 |
| 5,275,260 | 1/1994 | Evans et al. | 188/79.64 |
| 5,924,529 | 7/1999 | Ikeda et al. | 188/331 |

FOREIGN PATENT DOCUMENTS 2-13782  4/1990  Japan .

Primary Examiner—Chris Schwartz
Attorney, Agent, or Firm—Arent Fox Kintner Plotkin & Kahn, PLLC

[57] ABSTRACT

A drum brake device is provided in which a stroke before effectuating the parking brake effect of the brake shoes is restricted so that any disconcerting feeling to the driver and any delay in effectuating the parking brake when in an emergency situation are eliminated. The drum brake device includes a pair of the brake shoes 20, 21, a pivot lever 36 pivotally provided at one of the two brake shoes 21, a shoe clearance adjustment device provided between one end of the pivot lever 36 and one end of the brake shoe 20, and a strut provided between the other end of the pivot lever 36 and one end of the brake lever 28, wherein the braking force is transferable between the two brake shoes 20, 21 through the connection with the pivot lever 36. This produces a duo-servo type of brake device. The brake shoe 21 functions as a trailing shoe in which the lining wears slower when the service brake is in operation.

13 Claims, 13 Drawing Sheets

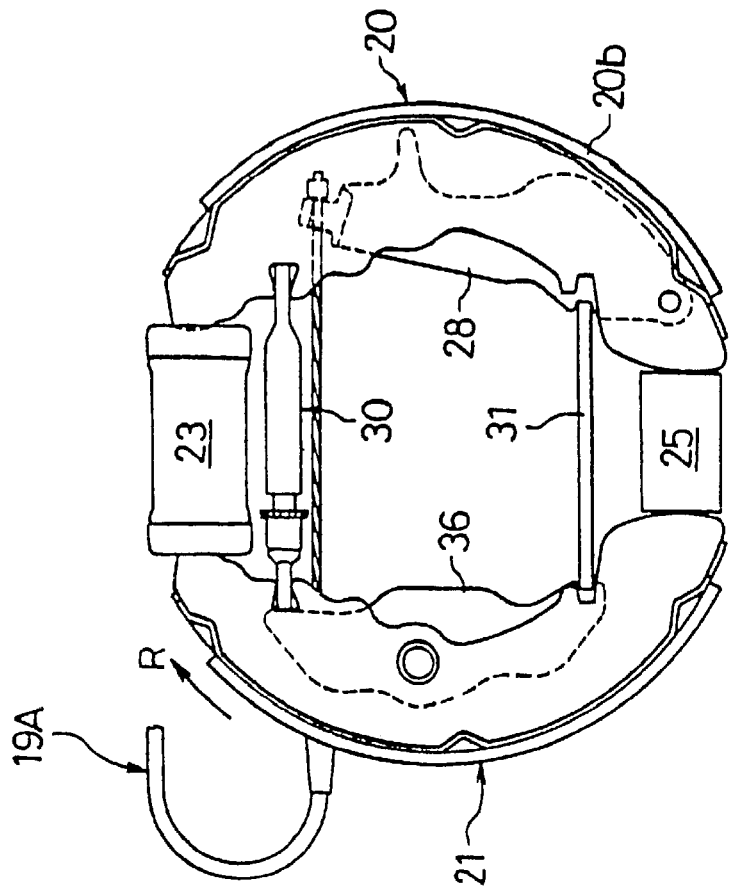
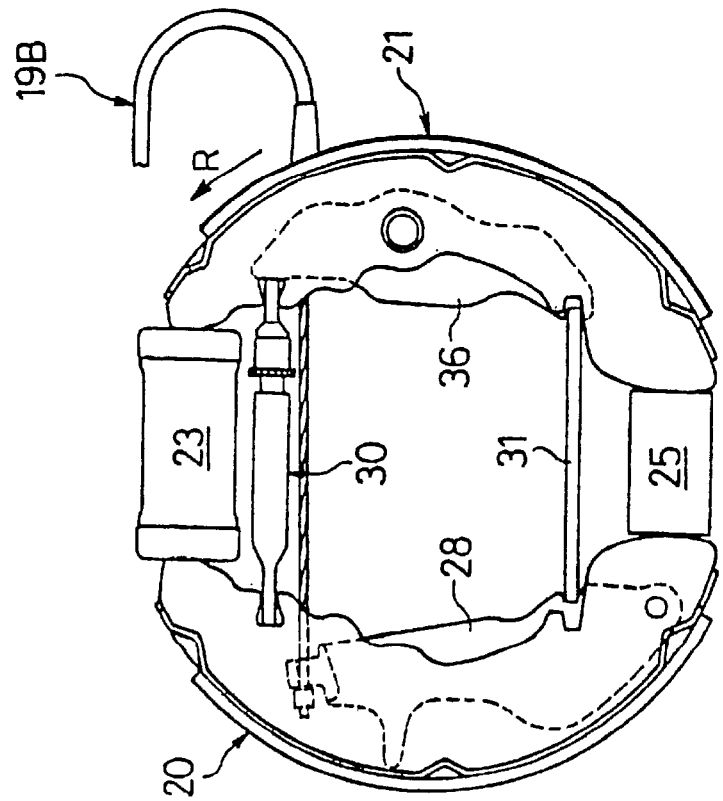

DRUM BRAKE SYSTEM AND DEVICE

BACKGROUND OF THE INVENTION

This invention relates to a drum brake device. More specifically, it relates to a drum brake device for a multi-wheel vehicle, such as an automobile, a forklift, and the like, that functions as a leading-trailing (LT) type when the service brake is applied, and as a duo-servo (DS) type when the parking brake is applied. This type of brake is called a dual mode drum brake.

FIG. 13 is a plan view of the typical rear chassis of the vehicle. The drum brake devices a, b are located on the right and left ends of the axle housing c. The back plates d, d of the drum brake devices a, b are mounted on each end of the axle housing c. The brake drums e, e are located to be exposed at each wheel side and to cover the two drum brake devices a, b. Each drum brake device includes a fluid operated service brake mechanism, a mechanical parking brake mechanism (neither of them shown in the diagram), and the parking brake cables f, g, both of which extend toward the front side of the vehicle.

A dual mode drum brake device has been disclosed in Australian Patent Number AU-B1-53 491/79 and U.S. Pat. No. 5,275,260.

The publicly disclosed drum brake device can be explained with FIG. 14. The upper and lower ends of the pair of brake shoes k, l are contacting the fluid pressure cylinder i and the anchor block j on the back plate d.

The pivot lever n is pivotally provided at the central region of the brake shoe k on the left side of the diagram, with the axis pin m as the fulcrum, while the brake lever o is pivotally provided at the lower portion of the brake shoe l on the right side of the diagram, with the axis pin p as the fulcrum. The parking brake cable f is connected to the free end of the brake lever o.

The first strut q is provided between the upper ends of the brake shoes k, l, and the second strut r is provided between the lower ends of the brake shoes k, l. The right end of the first strut q engages with the upper part of the pivot lever n and brake shoe k, and the left end of the first strut q engages with the brake shoe l. The right end of the second strut r engages with the lower part of the pivot lever n, and the left end of the second strut r engages with the brake lever o. The frictional force caused at the brake shoes k, l, when the parking brake in operation, is transferable between the two brake shoes k, l via the first strut q.

This type of drum brake device has its characteristics that the brake shoe k on the right side of the diagram, when the service brake is applied, operates as a leading shoe and the brake shoe l on the left side of the diagram operates as a trailing shoe, when the brake drum rotates in the direction of the arrow R with moving the vehicle forward.

Comparing the lining wear of the two brake shoes shows a major difference between them. Since the self-servo effect occurs only on a leading shoe, the brake shoe k with the pivot lever n (which is a leading shoe) will be worn about twice more than the brake shoe l (which is a trailing shoe).

The drum brake device as described above needs the following areas of improvement:

The return position of the brake lever is fixed. The pivot lever n is located at the leading shoe side, which is worn the most. The clearance $\delta_2$ between the pivot lever n and the second strut r increases as the lining is worn. The more the clearance $\delta_2$ increases, the longer the stroke to effectuate the parking brake becomes. More clearance requiring the longer stroke not only gives disconcerting feeling to the driver when stepping on the brake pedal but also creates a risk of delaying the parking brake effect in an emergency situation.

Additionally, the clearance is prone to cause unintended contact between the other components, especially when a size of the brake device is smaller, thereby causing a greater difficulty in laying out the brake lever.

The parking brake cable g connected to the muffler h side of the drum brake device b, as shown in FIG. 13, must be designed to be installed in the space among the leaf spring s, the shock absorber t, and the muffler h in due consideration of the bounding and rebounding motions of the axle housing c. This makes the layout of the installation of the parking brake cable g more complex.

OBJECTS AND SUMMARY OF THE INVENTION

This invention was designed to resolve the above disadvantages. To that end, an object of the invention is to provide a drum brake device which regulates the stroke increase even when the lining is worn, thereby eliminating any discomfort in the driver's feeling when operating the parking brake lever and eliminating a risk of delaying the parking brake effect.

The second object is to provide a drum brake device which facilitates the layout of the brake lever and is also effective in a drum with a smaller diameter.

The third object is to provide a drum brake device system which facilitates the layout of installing the parking brake cables.

In the first aspect of the invention, a drum brake device comprises a back plate, two brake shoes provided to face each other on the back plate, a fluid pressure cylinder on the back plate activated by a service brake provided between a pair of adjacent ends of the brake shoes, an anchor block on the back plate provided between a pair of the other adjacent ends of the brake shoes, a pair of struts provided between the two brake shoes, a parking brake lever pivotally provided on one of the brake shoes, and a pivot lever pivotally provided at a pivot point in the central region of the other brake shoe. One end of the pivot lever functionally engages one strut and the other end of the pivot lever functionally engages the other strut which abuts against the parking brake lever, thereby transferring the frictional force between the two brake shoes via the one strut when the parking brake is activated. The one brake shoe with the pivot lever functions as a trailing shoe.

In a second aspect of the invention, this drum brake device of the invention has the one strut be a shoe clearance adjustment device which adjusts the gap between the brake drum and the pair of brake shoes.

In a third aspect of the invention, this drum brake device of the invention has the shoe clearance adjustment device sense the amount of separation of the pair of the brake shoes and automatically extend the shoe clearance adjustment device.

In a fourth aspect of the invention, this invention is a brake system which comprises a pair of such drum brake devices, each provided on the right and left wheels where both drum brake devices are symmetrically structured and each one end of each control cable is connected to each parking brake lever and each of the other ends of each control cable extends initially toward the rear end of the vehicle to be curved toward the front end of the vehicle.

In a fifth aspect of the invention, this invention is a brake system which comprises a pair of such drum brake devices, each provided on the right and left wheels where both drum brake devices are symmetrically structured and each one end of each control cable is connected to each parking brake lever and each of the other ends of each control cable simply extends toward the front end of the vehicle.

In a sixth aspect of the invention, this invention is a brake system which comprises a pair of such drum brake devices, each provided on the right and left wheels where both drum brake devices are symmetrically structured and each one end of each control cable is connected to each parking brake lever and the other ends of each control cable extend in different, opposite directions.

BRIEF DESCRIPTION OF THE DRAWINGS

The above and other objects and the attendant advantages of the this invention will become readily apparent by reference to the following detailed description when considered in conjunction with the accompanying drawings wherein:

FIG. 10 is a simplified plan view of the drum brake devices A, B illustrated in the FIG. 9.

DETAILED DESCRIPTION OF PREFERRED EMBODIMENTS

EXAMPLE 1

Examples of this invention are explained with reference to the following figures.

Figure 9:
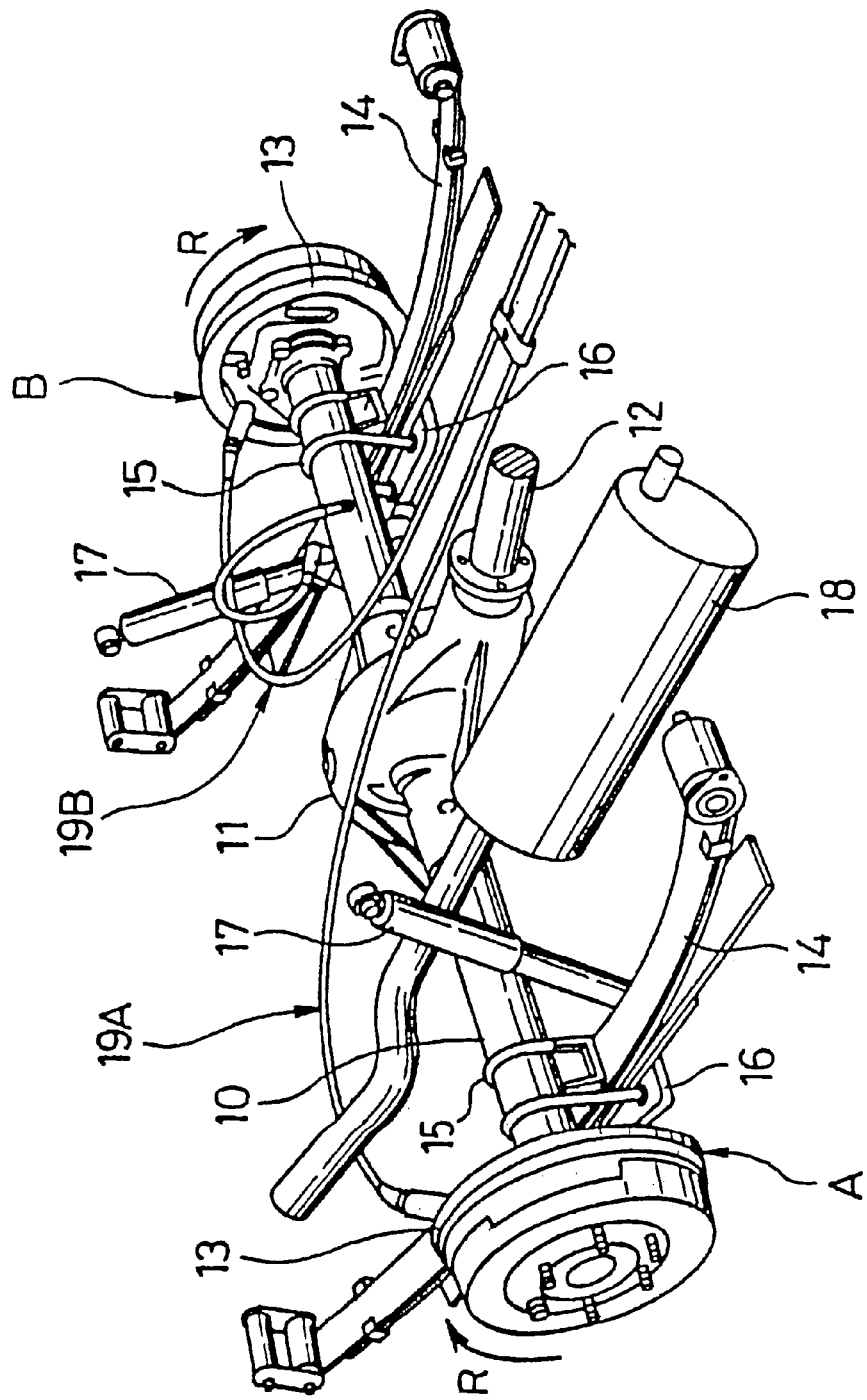
FIG. 9 is a diagonal, perspective view of the rear axle for a small size truck.

FIG. 9 is a diagonal, perspective view of the rear axle for a small size truck. A wheel axle (not shown in the diagram) is installed in the axle housing 10. The differential carrier 11, located in the center of the axle housing 10, receives and adjusts the rotating force received by the differential gear from the propeller shaft 12 and transfers it to the wheel axle.

The drum brake devices A, B, including back plates 13, 13, are provided on both ends of the axle housing 10. Each of the drum brake devices A, B, has a fluid operated service brake mechanism and a mechanical parking brake mechanism.

Leaf springs 14, 14 have middle portions fixed to the axle housing 10 with U-shaped bolts 15, 15. Both ends of each of the leaf springs 14, 14 are fixed to the vehicle frame. The shock absorbers 17, 17 are provided between the vehicle frame and the plates 16, 16 on which the U-shaped bolts 15, 15 are fastened. The leaf springs 14, 14 and the shock absorbers 17, 17 function as a suspension for the vehicle. A muffler 18 can be arranged on the side of the axle having the drum brake device A.

Each of the drum brake devices A, B, has a brake lever inside which is connected to one end of a parking brake cable 19A or 19B with degree of deflection. The other end of each cable 19A, 19B, is connected to a hand brake lever inside the vehicle compartment to pull the parking brake cable 19A or 19B and, consequently, the brake lever. Both parking brake cables 19A, 19B extend rearwardly outside of the drum brake devices A, B, then are curved to extend toward the front side of the vehicle.

FIG. 10 is a simplified plan view of the drum brake devices A, B illustrated in FIG. 9. R shows the rotational direction of a brake drum (not shown in the diagram) when the vehicle is moving forward. The parking brake cables 19A, 19B of the drum brake devices A, B extend rearwardly toward the rear end of the vehicle, then are curved to extend toward the front side of the vehicle so that one end of each parking brake cable can be connected to the hand brake lever.

Since the drum brake devices A, B have symmetrical components and same method of operation, this example only explains the drum brake device A which is positioned for mounting the right rear wheel, and an explanation of the drum brake device B positioned for the left rear wheel is omitted here.

The drum brake device A functions as a leading-trailing type when the service brake is applied and as a duo-servo type when the parking brake is applied. The back plate 13 is affixed to a stationary part of the axle housing 10.

The drum brake device A eliminates the problem of lining wear possibly caused on the lining 20b of the first brake shoe 20 functioning as a leading shoe by providing the pivot lever 36 on the second brake shoe 21 side functioning as a trailing shoe.

The detailed descriptions of the drum brake device A are explained according to FIGS. 2 to 8. A pair of brake shoes 20, 21 are pivotally mounted on the back plate 13 by the shoe-hold mechanisms 22, 22. One end or upper end (as shown) of the shoe webs 20a, 21a of the brake shoes 20, 21 engage with the pistons 24, 24 of the fluid operated service brake mechanism, the fluid pressure cylinder 23. The other end or lower end (as shown) of the shoe webs 20a, 21a, abut against the anchor block 25. The anchor could be either a plate-shaped part as in this example, a shaped part, or the like. The first return spring 26 is provided between the upper ends of the shoe webs 20a, 21a, and the second return spring 27 is provided between the lower ends of the shoe webs 20a, 21a.

The brake lever 28 to be pulled by the parking brake cable 19A, is superimposed under the shoe web 20a which is a component of the first brake shoe 20. One end of the brake lever 28 adjacent the anchor block 25 is pivotally supported by the pin 29 as the fulcrum.

The first strut, configured as shown as the shoe clearance adjustment device 30, is provided between the upper ends of the shoe webs 20a, 21a of the pair of the brake shoes 20, 21. The strut 31 is provided between the lower ends of the shoe webs 20a, 21a. The mechanical parking brake mechanism comprises the strut 31 and the brake lever 28.

The shoe clearance adjustment device 30 comprises a socket 32, a nut 33, and a bolt 35 with a toothed adjuster 34. The left end of the bolt 35 is pivotally inserted into the socket 32, and the right end of the bolt is screwed into the nut 33. The left end of the socket 32 fits with and abuts against the shoe web 21a of the second brake shoe 21 and the upper portion of the pivot lever 36. The right end of the nut 33 fits with and abuts against the shoe web 20a of the first brake shoe 20. The toothed adjuster 34 is turned manually or automatically by an adjustment lever 37 (explained below) so that the entire length of the shoe clearance adjustment device 30 may be changed, thereby adjusting the outer diameter of the brake shoes 20, 21.

Figure 2:
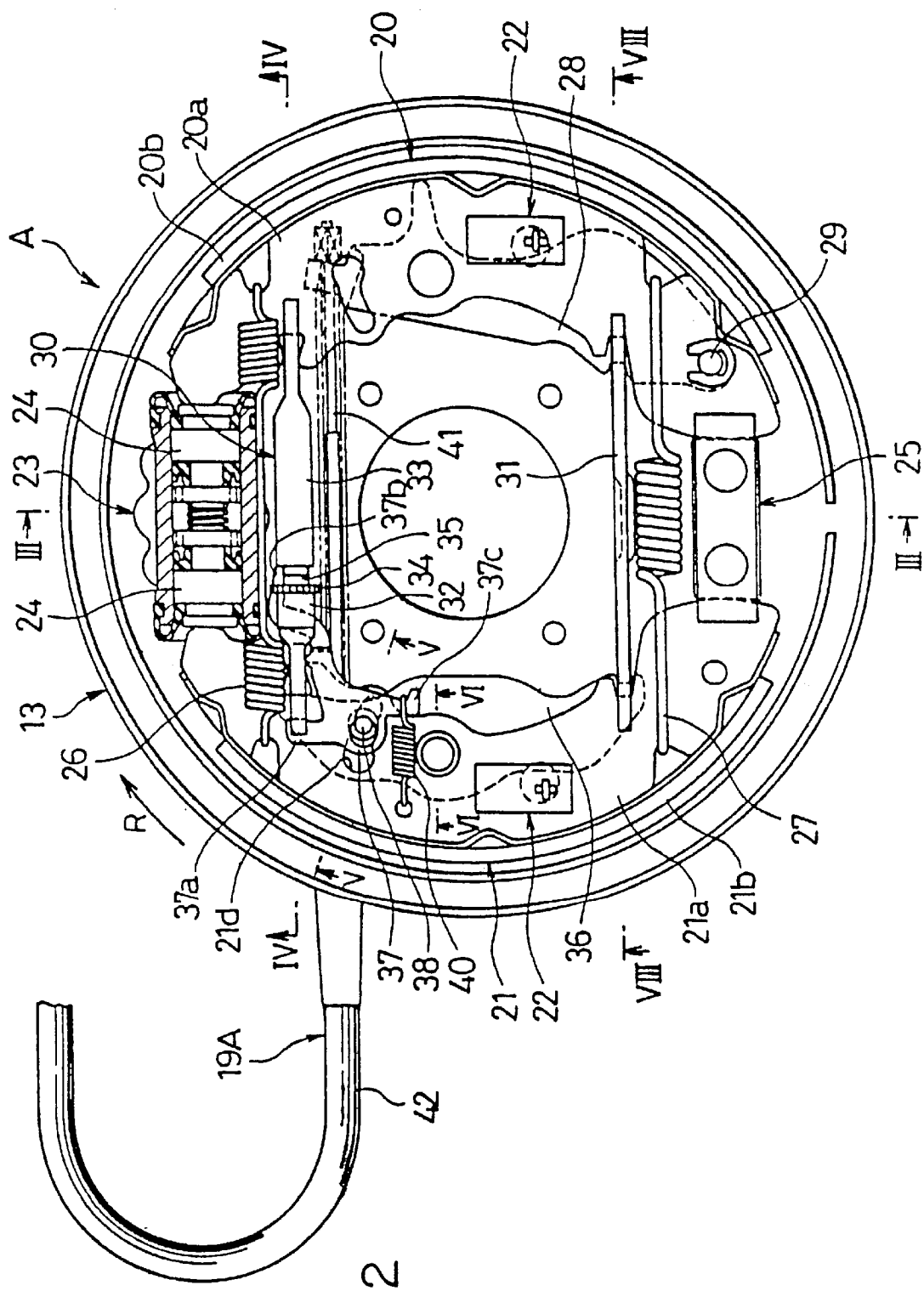
FIG. 2 is a plan view of the drum brake device of this invention.
Figure 3:
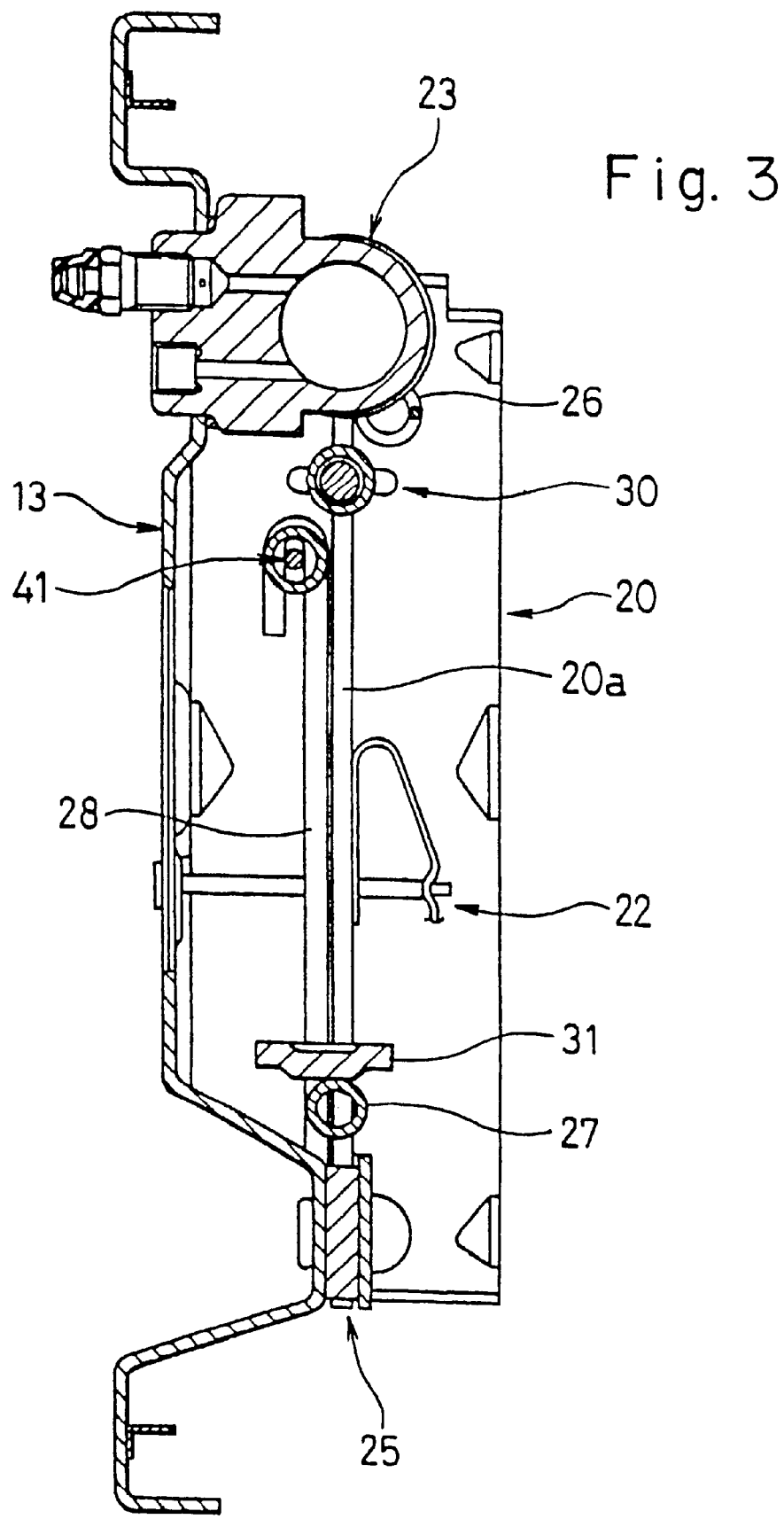
FIG. 3 is a cross section view of FIG. 2 taken along line III—III.
Figure 4:
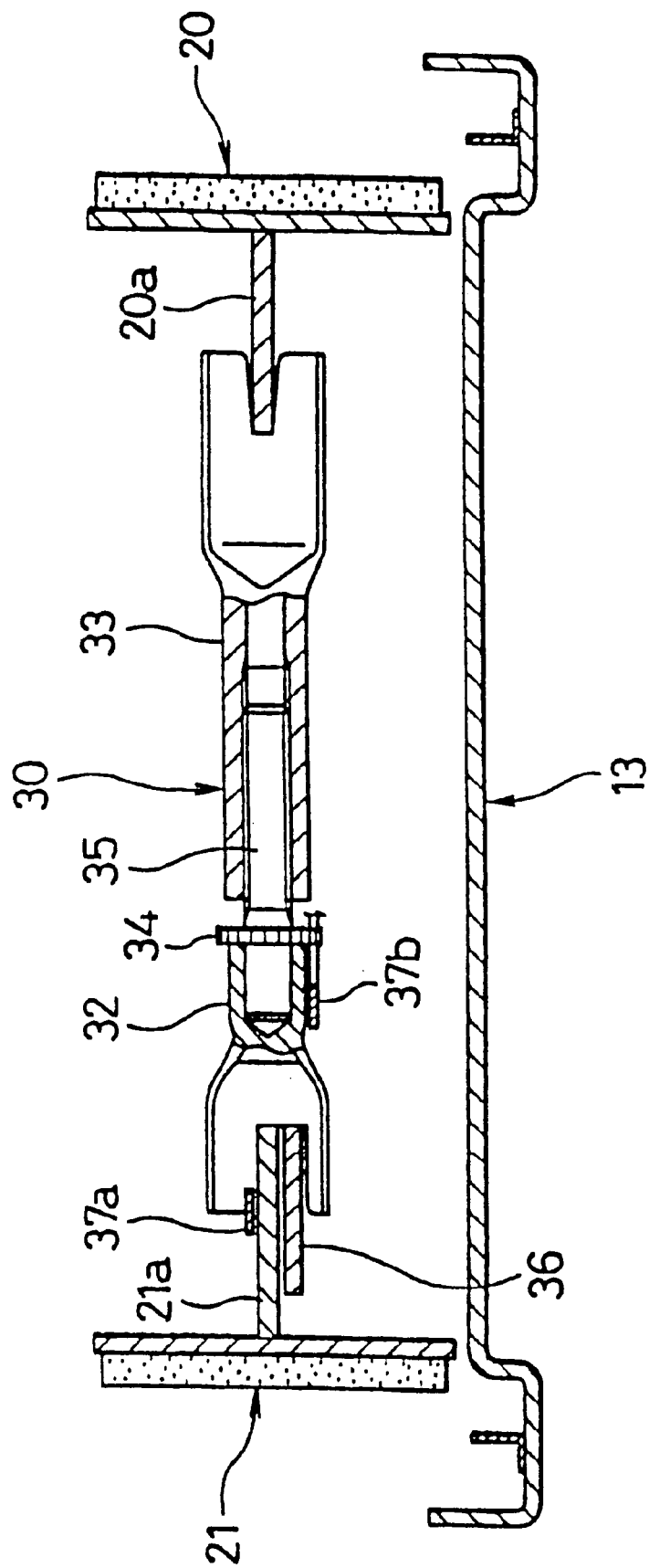
FIG. 4 is a cross section view of FIG. 2 taken along line IV—IV.
Figure 5:
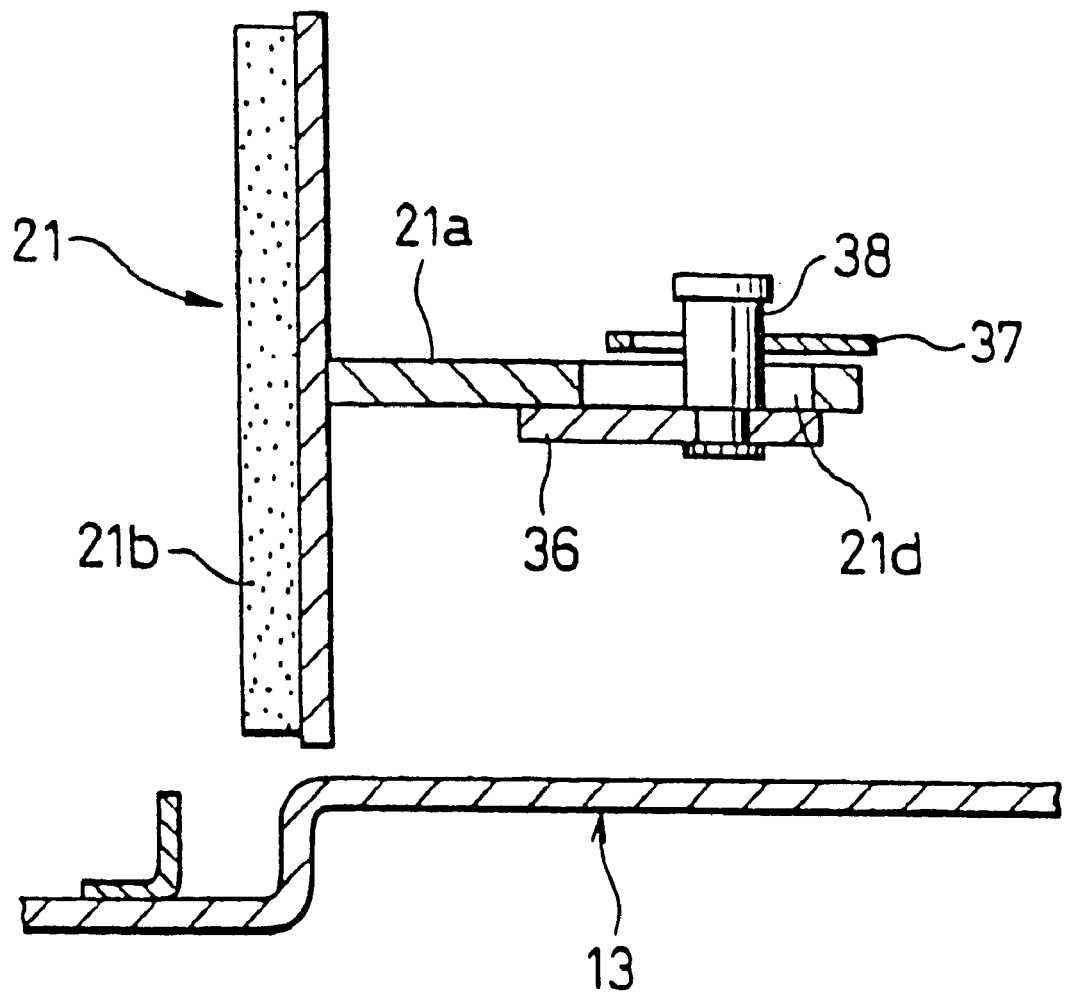
FIG. 5 is a cross section view of FIG. 2 taken along line V—V.

The adjusting mechanism of the outer diameter of the brake shoes 20, 21 is explained here with reference to the FIGS. 2 and 5. The axis pin 38 affixed on the pivot lever 36 penetrates through the slot 21d formed in the shoe web 21a. The adjustment lever 37 is pivotally installed with the axis pin 38 as the fulcrum. The first arm 37a of the adjustment lever 37 abuts against the socket 32. The second arm 37b engages with the toothed adjuster 34. The adjustment spring 40 is stretched between the third arm 37c of the adjustment lever 37 and the shoe web 21a of the brake shoe 21. The adjustment spring 40 is biased so as to turn the adjustment lever 37 clockwise.

An automatic shoe clearance adjustment device comprises the above-described shoe clearance adjustment device 30, adjustment lever 37, and adjustment spring 40. The automatic shoe clearance adjustment device is a device in which the adjustment spring 40 is biased, when the service brake is applied and the brake shoes 20, 21 spread open, so as to turn the adjustment lever 37 clockwise with the axis pin 38 as the fulcrum. At this point, if the linings 20b, 21b are worn and the degree of rotation of the second arm 37b exceeds the intertooth pitch of the toothed adjuster 34, the bolt 35 is rotated to be screwed out of the nut 33. This automatically adjusts the clearance between the brake drum (not shown in the diagram) and the linings 20b, 21b of the brake shoes 20, 21 to maintain a constant clearance. An automatic shoe clearance adjustment device, however, is not restricted to the type described above, and various other devices (conventional) may be used.

Figure 6:
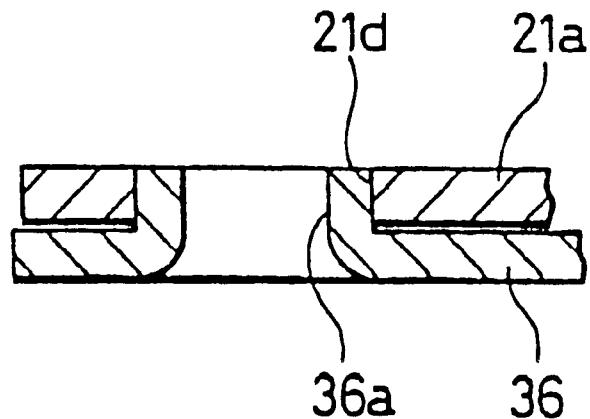
FIG. 6 is a cross section view of FIG. 2 taken along line VI—VI.
Figure 7:
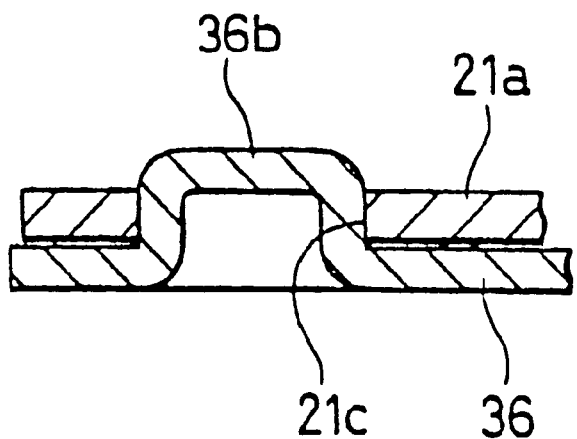
FIG. 7 is a cross section view of the pivot point of the pivot lever with a protuberance formed as a drawing with a press to be an inverse U shape.
Figure 8:
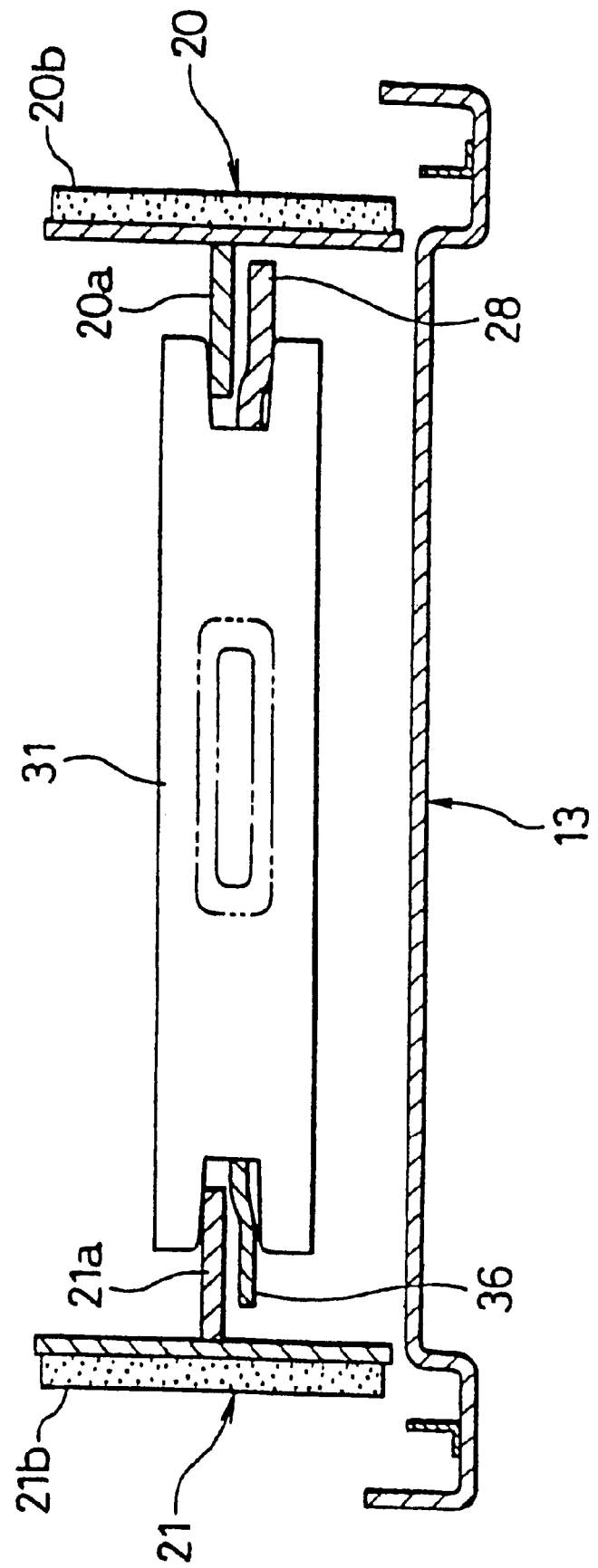
FIG. 8 is a cross section view of FIG. 2 taken along line VIII—VIII.

The pivot lever 36 is superimposed under the shoe web 21a of the second brake shoe 21. The central region of the pivot lever 36 is pivotally supported with the shoe web 21a as the fulcrum. In order to pivotally support the pivot lever 36, the protuberance 36a formed as a burr with a press, is formed in the central region of the pivot lever 36 and slips into the hole 21c bored in the shoe web 21a. FIG. 6 illustrates the shape of the protuberance 36a; however, it can also be formed as a drawing with a press to be an inverse U-shaped protuberance 36b as shown in FIG. 7. Either one of the protuberances 36a or 36b is integrally formed by a press with the pivot lever 36, but a separate pin can be easily used to support the pivot lever 36 so as to be pivotable.

As shown in FIG. 2, the upper end of the pivot lever 36 abuts against the socket 32 of the shoe clearance adjustment device 30, and the lower end abuts against the left end of the strut 31. The right end of the strut 31 abuts against the central region of the brake lever 28 between the fulcrum and the connection with the parking brake cable 19A. The frictional engagement force caused during the parking brake operation at the brake shoes 20, 21 is transferable via the shoe clearance adjustment device 30.

The parking brake cable 19A comprises an inner cable 41 and an outer casing 42. One end of the inner cable 41 is connected to the free end of the brake lever 28, and the other end is connected to a pulling device, such as the hand brake lever inside the vehicle compartment. One end of the outer casing 42 is affixed to the back plate 13, and the other end is affixed to the vehicle frame.

Figure 1:
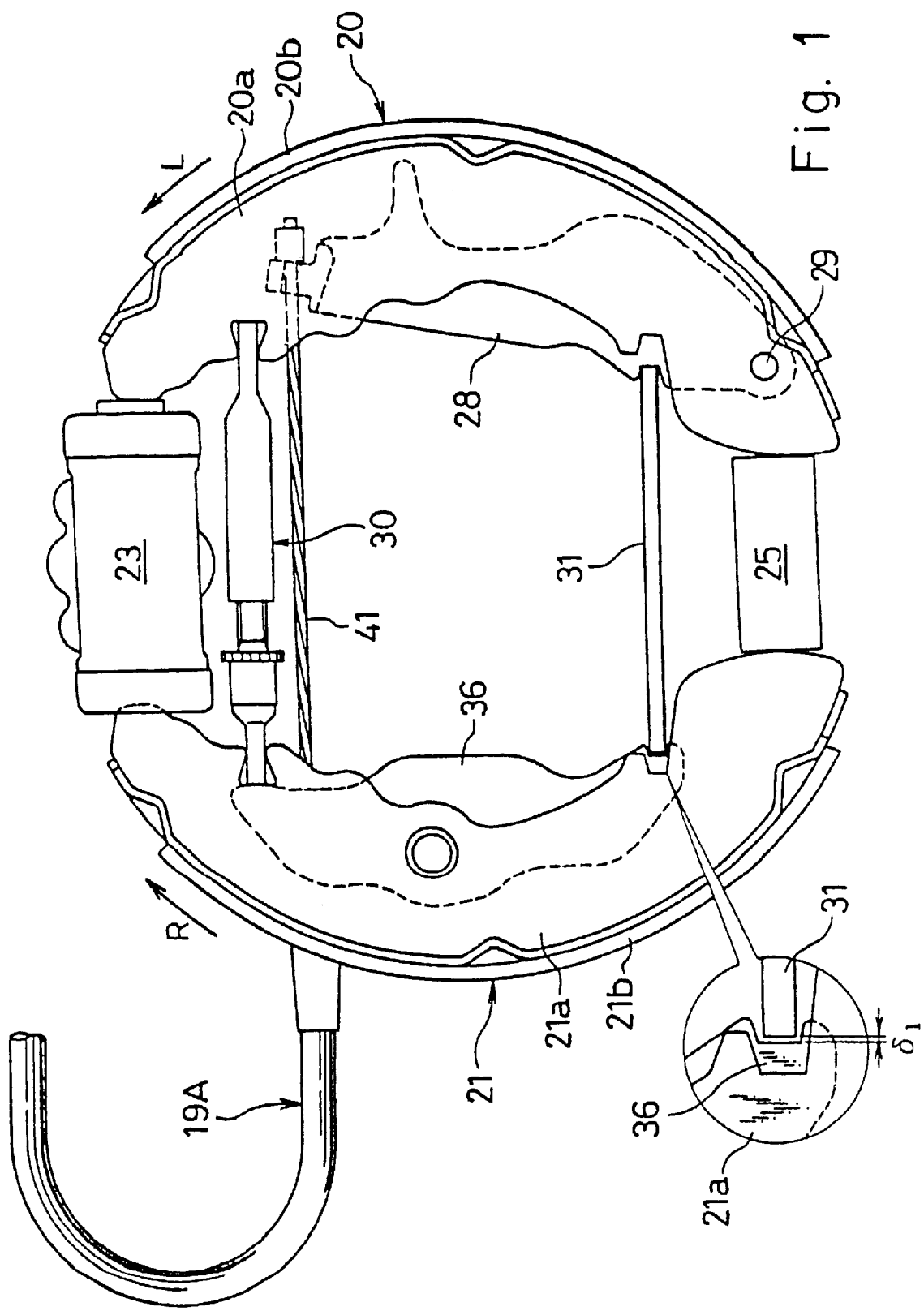
FIG. 1 is a simplified plan view of the drum brake device of this invention as embodied in Example 1.

FIG. 1 is a simplified plan view of one of the drum brake devices. When the fluid pressure cylinder 23 is pressurized and extends, the ends of both brake shoes 20, 21 are spread apart, thereby causing the frictional force on the rotating brake drum (not shown in the diagram). When the vehicle is moving forward and the brake drum rotates in the direction of arrow R, the first brake shoe 20 functions as a self-servo leading shoe and the second brake shoe 21 functions as a non-self-servo trailing shoe.

For actuating the parking brake, the inner cable 41 of the parking brake cable 19A is pulled to turn the brake lever 28 counterclockwise with the pin 29 as the fulcrum and to press the strut 31 to the left. As the strut 31 is being pressed, the pivot lever 36 turns clockwise, and the force is transferred to open the first brake shoe 20 via the shoe clearance device 30. Moreover, as the pivot lever 36 turns clockwise with the abutting point with the shoe clearance adjustment device 30 as the fulcrum, the force is transferred to the second brake shoe 21 via the pivot point of the pivot lever with the shoe web 21a, whereupon the second brake shoe 21 spreads apart to press against the brake drum.

Should the vehicle be stopped on an incline and torque thereby be applied on the brake drum in the direction of arrow L, the friction force of the first brake shoe 20 is transferred via the shoe clearance adjustment device 30 to the second brake shoe 21, and the end of the second brake shoe 21 will be blocked by the anchor block 25, thereby functioning as a duo-servo type wherein both brake shoes 20, 21 have duo-servo effect.

Should the vehicle be stopped on a decline and the torque thereby be applied on the brake drum in the direction of arrow R, the friction force of the second brake shoe 21 is transferred via the shoe clearance adjustment device 30 to the first brake shoe 20, and the end of the first brake shoe 20 will be blocked by the anchor block 25, thereby functioning as a duo-servo type wherein both brake shoes 20, 21 have duo-servo effect.

Generally, the service brake is used more often while the vehicle is moving forward than moving backward. The lining 20b of the first brake shoe 20 (leading shoe) tends to be worn much faster than the lining 21b of the second brake shoe 21 (trailing shoe).

Having the pivot lever 36 on the second brake shoe 21 (trailing shoe) side where the lining wears slower just as the present invention, does not increase the clearance $\delta_1$ as much as having the pivot lever on the first brake shoe 20 (leading shoe) side where the lining wears faster as in the conventional device. That is, even if the lining 20b of the first brake shoe 20 (leading shoe) wears and the position of the first brake shoe 20 shifts toward the brake drum, the inner cable 41 enables the brake lever 28 to maintain its pre-set position regardless of lining wear of the lining 20b; therefore, the clearance $\delta_1$ does not prevent the effective parking brake operation as much. Thus, the stroke before effectuating the parking brake of the brake shoes 20, 21 is almost the same as the brake shoes with new linings even with the substantial lining wear.

EXAMPLE 2

Example 2 is another embodiment of the drum brake device of this invention. The components which are virtually the same as in Example 1 are identified with the same reference signs wherein an explanation is omitted here.

Figure 11A:
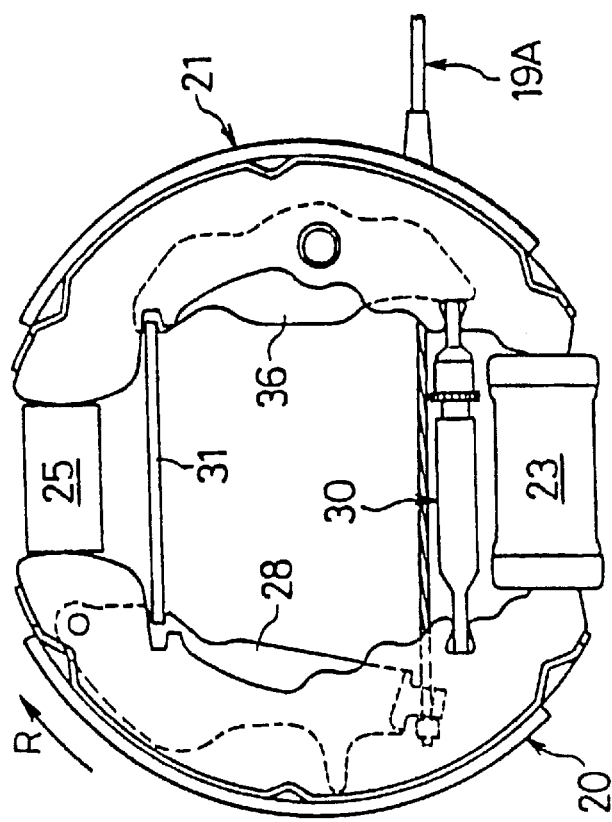
FIG. 11 explains a simplified plan view of the drum brake devices described in Example 2.
Figure 11B:
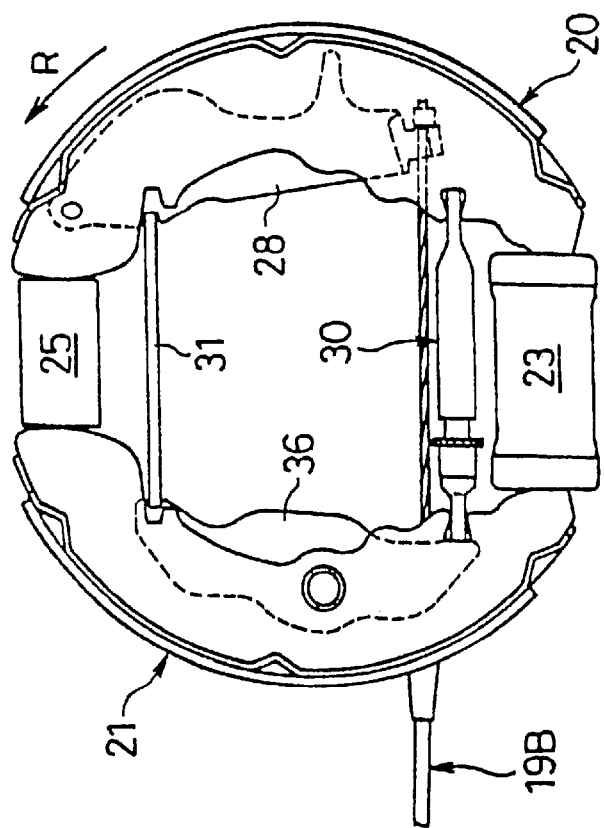

FIG. 11 illustrates the parking brake cables 19A, 19B connected to the drum brake devices A, B and pulled toward the front end of the vehicle just as in the conventional devices. This example illustrates the drum brake devices A, B of Example 1 which are turned 180 degrees with the fluid pressure cylinders 23, 23 below the anchor blocks 25, 25. As explained in Example 1, the drum brakes A, B are symmetrically structured, and the pivot lever 36 is provided on the trailing shoe (brake shoe 21) side.

EXAMPLE 3

Figure 12A:
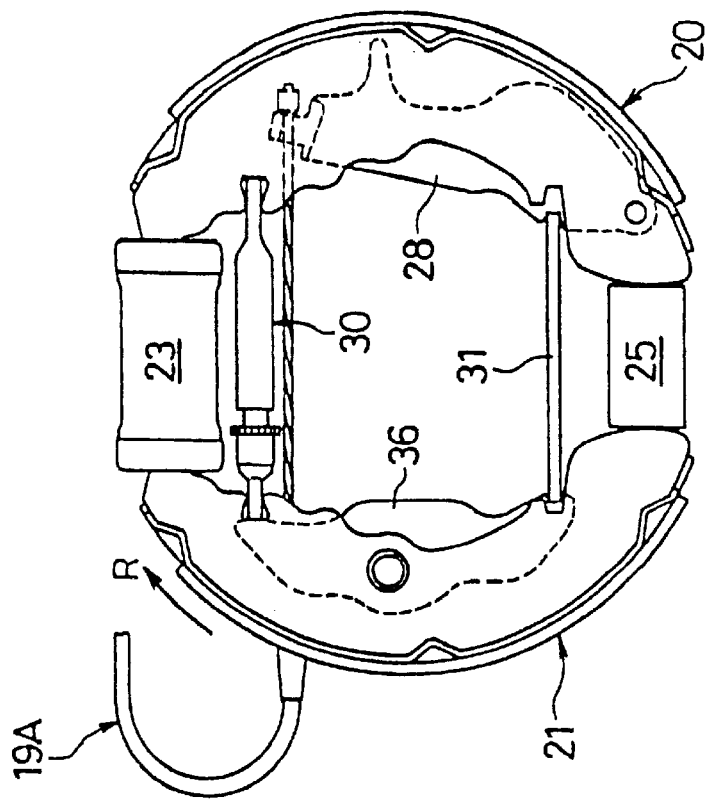
FIG. 12 explains a simplified plan view of the drum brake devices described in Example 3.
Figure 12B:
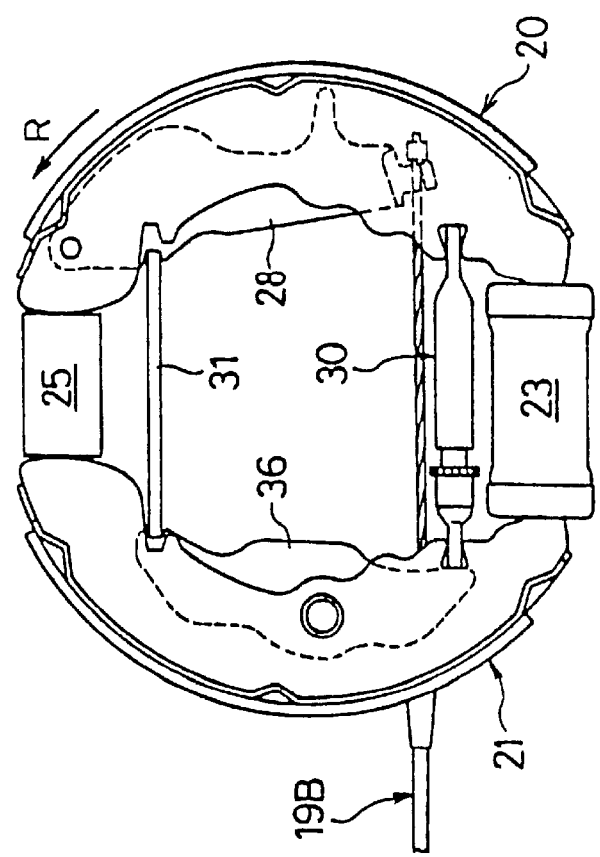
Figure 13:
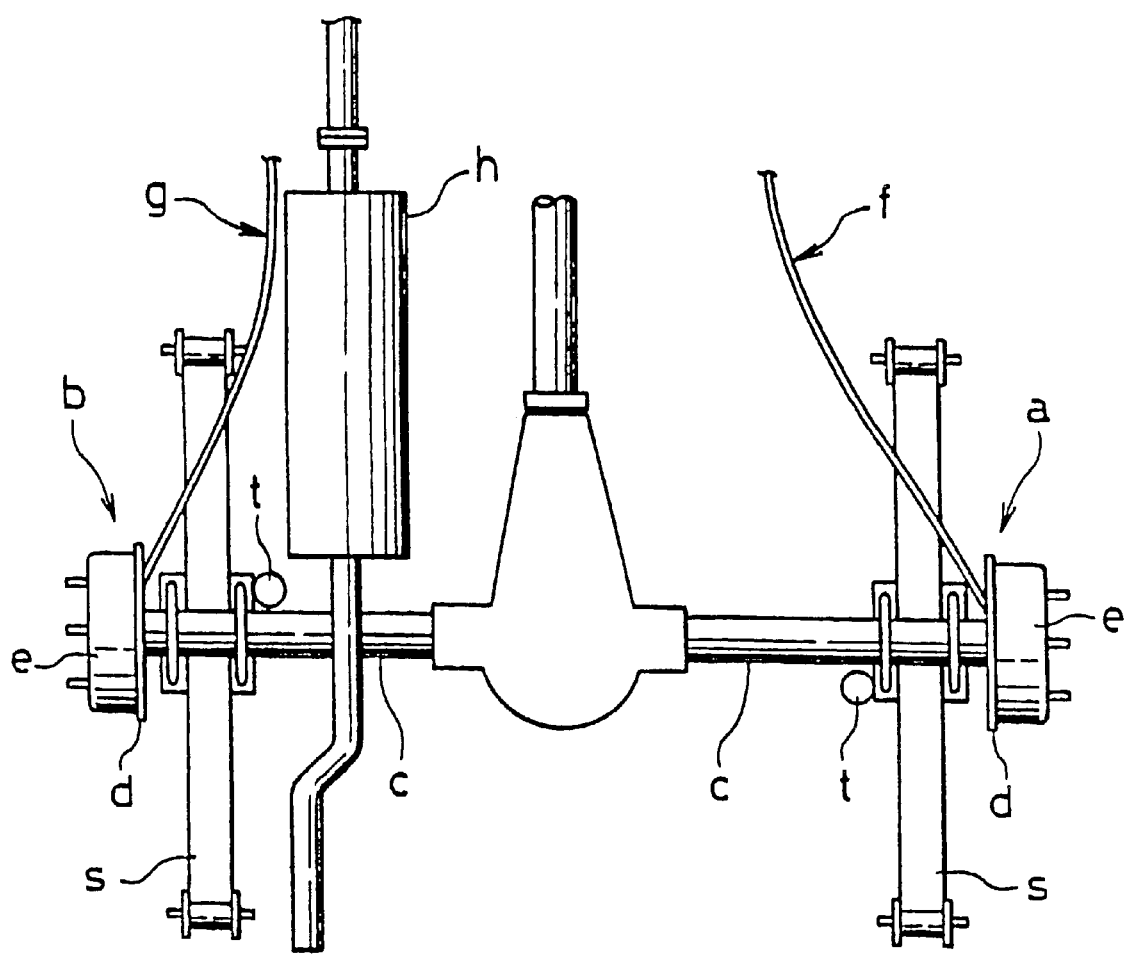
FIG. 13 explains a plan view of the rear, conventional axle for a small size truck.
Figure 14:
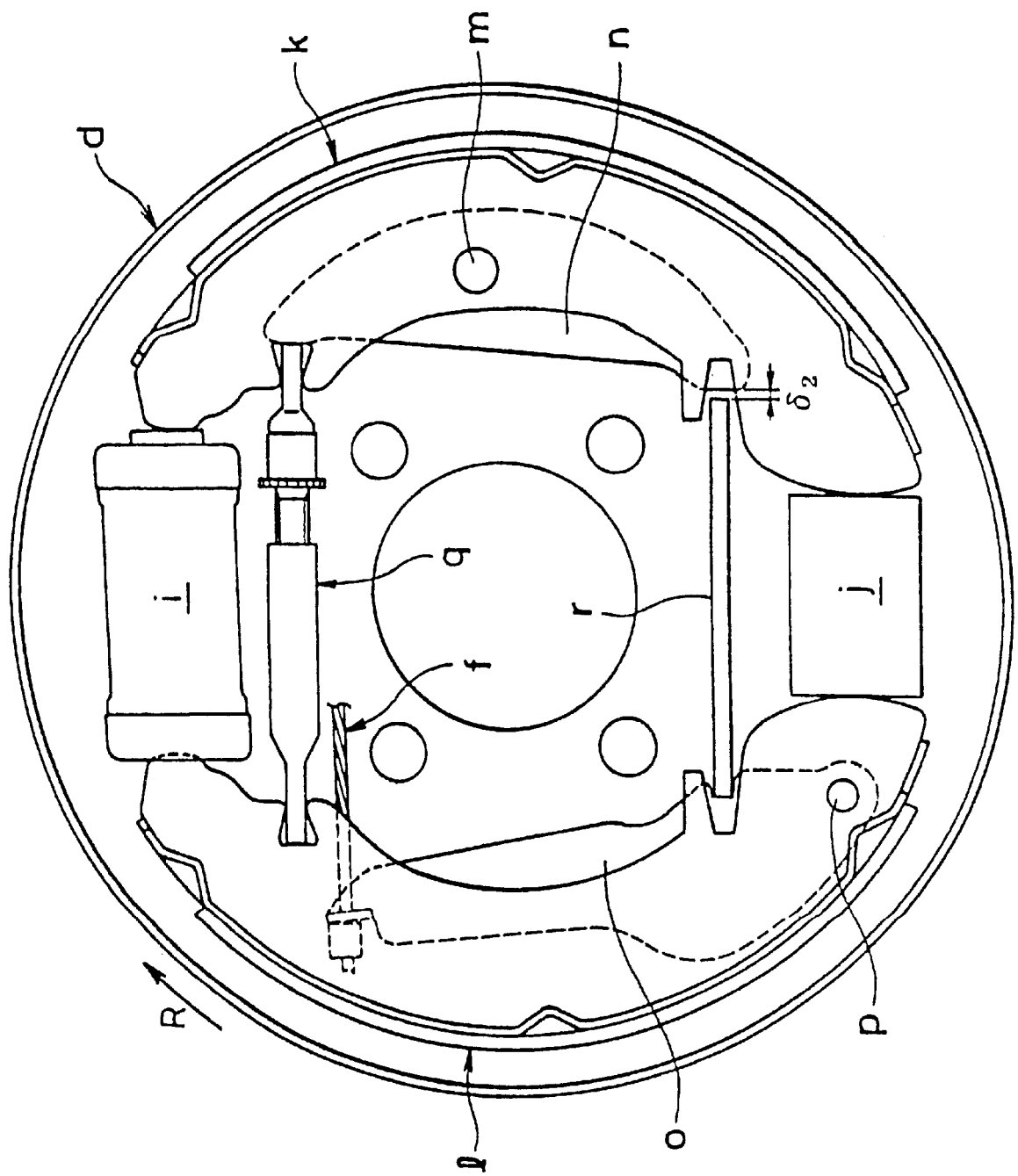
FIG. 14 is a simplified plan view of a conventional drum brake device.

FIG. 12 illustrates the installation of the parking brake cables 19A, 19B, where the parking brake cable 19A on the muffler side extends rearwardly is curved to extend toward the front side of the vehicle and the parking brake cable 19B is routed to extend toward the front side of the vehicle. The fluid pressure cylinders 23, 23, are each located oppositely to each other. That is, in one of the drum brake devices, the fluid pressure cylinder is below the anchor block while in the other device, the fluid pressure cylinder is above the anchor block.

EXAMPLE 4

This invention is by no means limited to the embodiments described above. For example, both parking brake cables 19A, 19B can be provided parallel to the axle housing as shown in Japanese Utility Model Publication Number 2-13782.

Having a pivot lever on the trailing shoe side where the lining wears more slowly, does not increase the clearance $\delta_1$ as much as having a pivot lever on the leading shoe side where the lining wears faster.

Thus, a stroke before effectuating a parking brake is almost the same as brake shoes with new linings even with substantial lining wear. This reduces a chance of creating play in the parking brake operation, thereby eliminating any disconcerting feeling to the driver and any delay in effectuating the parking brake when in an emergency situation.

A longer stroke is not necessary to effectuate the parking brake, which facilitates the layout of the brake lever and enable use of a brake device with a smaller size.

When a muffler obstructs the installation of parking brake cables, parking brake cables can extend rearwardly of the vehicle to facilitate installation.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A drum brake device comprising;

a back plate;

first and second brake shoes facing each other on said back plate; a fluid pressure cylinder on said back plate which is activated by a service brake and is provided between a pair of adjacent ends of said brake shoes a parking brake lever pivotally mounted to said first brake shoe;

a pair of struts provided between said brake shoes; and a pivot lever pivotally provided at a pivot point in a central region of said second brake shoe, one end of said pivot lever functionally engages one strut and another end of said pivot lever functionally engages another strut which engages the parking brake lever, wherein a frictional force is transferred between said first and second brake shoes via said one strut when activating the parking brake, and wherein said second brake shoe with said pivot lever functions as a trailing shoe when activating the service brake in driving forward.

2. A drum brake device of claim 1, wherein said one strut is a shoe clearance adjustment device which adjusts the clearance between a brake drum and said first and second brake shoes.

3. A drum brake device of claim 2, wherein said shoe clearance adjustment device senses the amount of movement of said first and second brake shoes and automatically extends said shoe clearance adjustment device.

4. A drum brake system for a vehicle comprising:

a pair of drum brake devices, each drum brake device being provided on right and left wheels of the vehicle, respectively, wherein a majority of parts of said drum brake devices are symmetrically structured, each drum brake device including:

a back plate;

first and second brake shoes facing each other on said back plate;

a fluid pressure cylinder on said back plate which is activated by a service brake and is provided between a pair of adjacent ends of said brake shoe;

an anchor block on said back plate provided between a pair of other adjacent ends of said brake shoe;

a parking brake lever pivotally mounted to said first brake shoe;

a cable having one end connected to the parking brake level;

a pair of struts provided between said brake shoes; and a pivot lever pivotally provided at a pivot point in a central region of said second brake shoe, one end of said pivot lever functionally engages one strut and another end of said pivot lever functionally engages another strut which engages the parking brake lever, wherein a frictional force is transferred between said first and second brake shoes via said one strut when activating the parking brake, and wherein said second brake shoe with said pivot lever functions as a trailing shoe.

5. A drum brake system of claim 4, wherein another end of said cable initially extends toward a rear end of the vehicle and is curved toward a front side of the vehicle.

6. A drum brake system of claim 5, wherein each of said one strut is a shoe clearance adjustment device which adjusts a clearance between a brake drum and said first and second brake shoes.

7. A drum brake device of claim 6, wherein said shoe clearance adjustment device senses an amount of separation of said first and second brake shoes and automatically extends said shoe clearance adjustment device.

8. A drum brake system of claim 4, wherein another end of said cable extends toward a front side of the vehicle.

9. A drum brake system of claim 8, wherein said one strut is a shoe clearance adjustment device which adjusts a clearance between a brake drum and said first and second brake shoes.

10. A drum brake system of claim 9, wherein said shoe clearance adjustment device senses an amount of separation of said first and second brake shoes and automatically extends said shoe clearance adjustment device.

11. A drum brake system of claim 4, wherein another end of said cable extends in a direction opposite to the one end connected to the parking brake lever.

12. A drum brake system of claim 4, wherein said one strut is a shoe clearance adjustment device which adjusts a clearance between a brake drum and said first and second brake shoes.

13. A drum brake system of claim 12, wherein said shoe clearance adjustment device senses an amount of separation of said first and second brake shoes and automatically extends said shoe clearance adjustment device.

* * * * *